United States Patent [19]
Ashdown

[11] Patent Number: 5,253,036
[45] Date of Patent: Oct. 12, 1993

[54] NEAR-FIELD PHOTOMETRIC METHOD AND APPARATUS

[75] Inventor: Ian E. Ashdown, West Vancouver, Canada

[73] Assignee: Ledalite Architectural Products Inc., Richmond, Canada

[21] Appl. No.: 755,700

[22] Filed: Sep. 6, 1991

[51] Int. Cl.$^5$ .............................................. G01J 1/00
[52] U.S. Cl. ..................................... 356/121; 356/222
[58] Field of Search ............... 356/121, 122, 213, 215, 356/218, 219, 221, 222

[56] References Cited

U.S. PATENT DOCUMENTS

| | | | |
|---|---|---|---|
| 3,358,944 | 12/1967 | Ule | 356/213 |
| 4,110,049 | 8/1978 | Younskevicius | 356/222 |
| 4,491,727 | 1/1985 | Appelbaum et al. | 356/222 |

FOREIGN PATENT DOCUMENTS

| | | | |
|---|---|---|---|
| 0159278 | 12/1979 | Japan | 356/213 |
| 8302003 | 6/1983 | PCT Int'l Appl. | 356/121 |

OTHER PUBLICATIONS

American National Standard Nomenclature and Definitions for Illuminating Engineering (ANSI/IES RP-6-1986), IESNA, N.Y., NY.

Ashdown, I.E. [1990]. "A Scanning Goniophotometer for Near Field Photometry", Unpublished paper presented Jun. 19, 1990, International Lighting Exposition, Toronto, Ont., Canada.

Bradford, R. A. and S. Stannard [1991]. "Refinements to Application Distance Photometry", 1991 IESNA Annual Conference Technical Papers, Illuminating Engineering Society of North America, N.Y., NY.

Cohen, M. F. and D. P. Greenberg [Jul. 1985]. "The Hemi-Cube: A Radiosity Solution for Complex Environments", ACM Transactions on Graphics 19:3 (SIGGRAPH '85 Proceedings), 31-40.

Dunlop, D. and D. M. Finch [Mar. 1962]. "Photometry of Fluorescent Luminaires-Rotating Photocell Method", Illuminating Engineering 57:3, 159-165.

Franck, K. [Dec. 1950]. "A Method of Testing and Evaluating Fluorescent Luminaires", Illuminating Engineering 45:12, 763-770.

Horn, C. E., W. F. Little and E. H. Salter [Feb. 1952]. "Relation of Distance to Candlepower Distribution from Fluorescent Luminaires", Illuminating Engineering 47:2, 99-104.

Johnson, R. C., H. A. Ecker and J. S. Hollis [Dec. 1973]. "Determination of Far-Field Antenna Patterns from Near-Field Measurements", Proc. IEEE 61:12, 1668-1694.

Lautzenheiser, T., G. Weller and S. Stannard [1984]. "Photometry for Near Field Applications", J. IES 13:1, 262-269, Jan. 1984.

Levin, R. E. [Oct. 1968]. "Luminance-A Tutorial Paper", J. SMPTE 77:10, 1005-1011.

Levin, R. E. [Apr. 1971]. "Photometric Characteristics of Light Controlling Apparatus", Illuminating Engineering 66:4, 205-215.

Levin, R. E. [1982]. "The Photometric Connection-Part 1", Lighting Design & Application (Sep.), 28-35; ... Part 2, Lighting Design & Application (Oct.), 60-63; ... Part 3, Lighting Design & Application (Nov.), 42-47; and, ... Part 4, Lighting Design and Application (Dec.), 16-18.

. (List continued on next page.)

Primary Examiner—Richard A. Rosenberger
Assistant Examiner—Hoa Q. Pham
Attorney, Agent, or Firm—Barrigar & Oyen

[57] ABSTRACT

A near-field goniophotometric apparatus and method for measuring the three-dimensional near-field distribution of luminous flux surrounding a light source. The apparatus incorporates an imaging photometer mounted on a rotatable arm. The photometer is designed to measure the helios of a volume of space rather than the luminance of a planar surface, and to simultaneously measure the helios of a plurality of such volumes. A control mechanism is provided to position the arm and to rotate the light source relative to the arm. The method facilitates prediction of the illuminance or irradiance at a point on a plane from the helios measurements.

6 Claims, 9 Drawing Sheets

OTHER PUBLICATIONS

Lewin, I. [1991]. "Photometry: How Near, How Far?", Lighting Magazine (Feb.), 33–34; and, . . . Part 2, Lighting Magazine (Jun.), 45–46.

Losh, J. A. [May 1954]. "A Rectangular Coordinate Photometer for Large-Area Luminaires", Illuminating Engineering 49:5, 258–264.

Mistrick, R. G. and C. R. English [1990]. "A Study of Near-Field Indirect Lighting Calculations", J. IES 19:2 (Summer), 103–112.

Moon, P. and D. E. Spencer [Sep. 1944]. "Brightness and Helios", Illuminating Engineering 39:9, 507–520.

Moon, P. and D. E. Spencer [1981]. "The Photic Field", MIT Press, Cambridge, Mass.

Ngai, P. Y. [1987]. "On Near-Field Photometry", J. IES 16:2 (Summer), 129–136.

Ngai, P. Y., F. G. Zhang and J. X. Zhang [Jan. 1991]."Near-Field Photometry: Measurement and Application for Fluorescent Luminaires", Jan.-1991 IESNA Annual Conference Technical Papers, Illuminating Engineering Society of North America, N.Y., NY.

Rea, M. S. and I. G. Jeffrey [1990], "A New Luminance and Image Analysis System for Lighting and Vision", J. IES 19:1 (Winter), 64–72.

Schaefer, A. R. and K. Mohan [1974]. "A New Gonioradiometer for Total Flux Measurements", J. IES 3:7, 349–353; Jul. 1974.

Skinner, G. K. [1988]. "X-Ray Imaging with Coded Masks", Scientific American (Aug.), 84–89; Aug.-1988.

D. E. Spencer and R. E. Levin [Apr. 1966]. "On the Significance of Photometric Measurements", Illuminating Engineering 61:4, 196–204.

Stannard, S. and J. Brass [1990]. "Application Distance Photometry", J. IES 19:1 (Winter), 39–46.

Takahashi, S., S. Okadu and K. Fujii [Apr. 1982]. "Development of Luminance Pattern Analyzer Utilizing Industrial TV Techniques", J. IES 11:4, 147–152.

Yamauti, Z. [Oct. 1932] "Theory of Field of Illumination", Researches of the Electrotechnical Laboratory (Oct.), Electrotechnical Laboratory, Ministry of Communications, Tokyo, Japan.

Gershun, A. [1936] "Svetovoe Pole" (The Light Field), Moscow, Translated by P. Moon and G. Timoshenko in Journal of Mathematics and Physics vol. XVIII (1939), Massachusetts Institute of Technology.

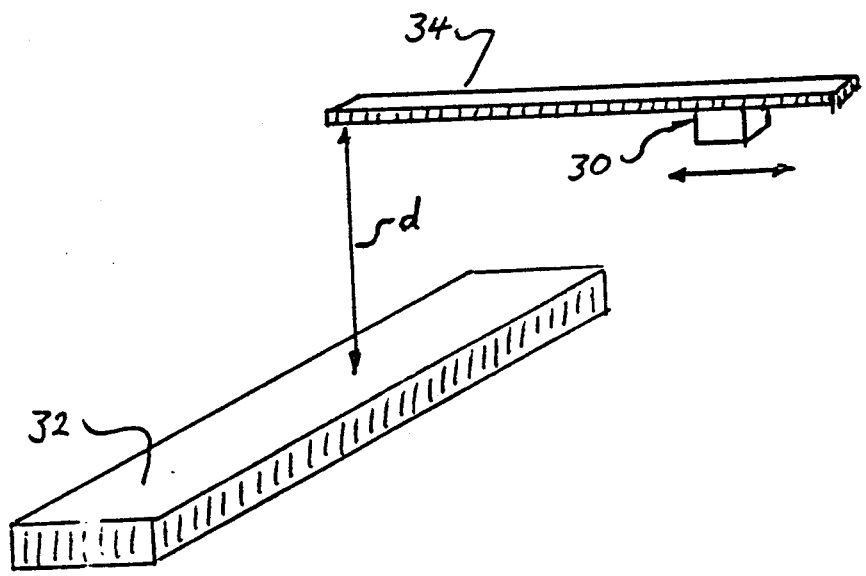
FIGURE 2         PRIOR ART

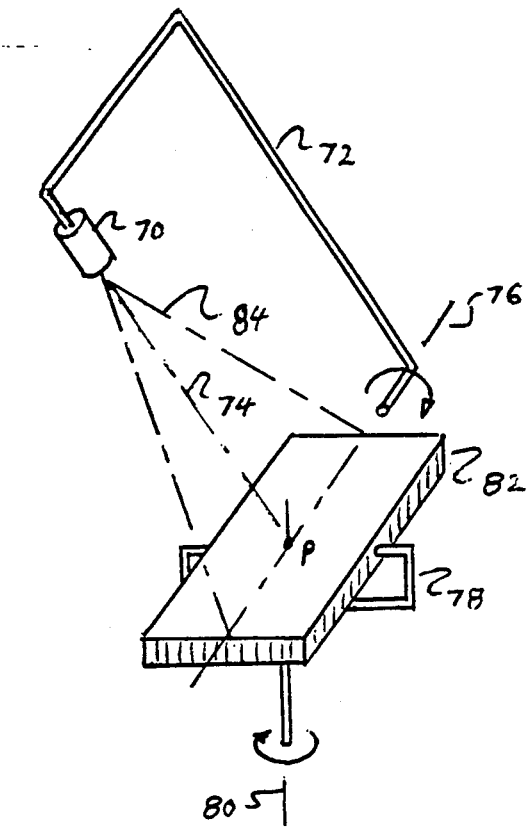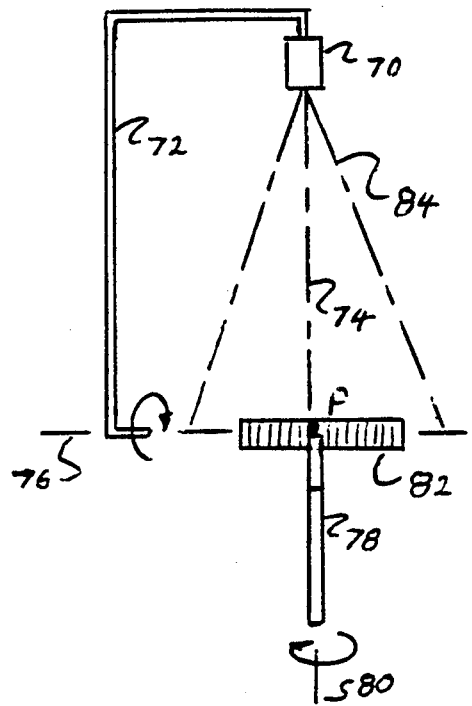
FIGURE 9A                    FIGURE 9B

NEAR-FIELD PHOTOMETRIC METHOD AND APPARATUS

FIELD OF THE INVENTION

This application pertains to a method and apparatus for measuring the three dimensional near-field distribution of luminous flux surrounding a light source; and, to a method of using such measurements to predict the illuminance at a point on a plane located at a selected position relative to the light source.

BACKGROUND OF THE INVENTION

The science of goniophotometry involves the measurement of the luminous flux emitted by a light source such as a light fixture (termed a "luminaire" in the art). Traditional goniophotometric techniques have modelled luminaires as point sources of light. A rule of thumb commonly used by the lighting industry for nearly a century requires the goniophotometer sensor to be positioned at a distance from the luminaire that is at least five times that of its maximum projected width as seen from the sensor. This is often called the "Five-Times Rule". See: "Relation of Distance to Candlepower Distribution from Fluorescent Luminaires", Illuminating Engineering 47:2, 99–104, C. Horn, W. Little and E. Salter [1952].

Measuring the flux distribution of a luminaire that has been modelled as a point source is referred to as "far-field" photometry. The technique is analogous to the far-field measurements of radio and microwave antennae, albeit with an incoherent radiation source. The measurements are expressed in terms of luminous intensity (candela, or lumens per steradian) as a function of the vertical and horizontal angles of a spherical co-ordinate system centred on the luminaire.

There is no photometric analogue to the "near-field" measurements of radio or microwave antennae, in that diffraction effects play no significant role in luminaire photometry (see for example: "Determination of Far-Field Antenna Patterns From Near-Field Measurements", Proc. IEEE 61:12, 1668–1694, R. C. Johnson, H. A. Ecker and J. S. Hollis [1973]). Nevertheless, it does make sense to refer to the "near-field" flux distribution of a luminaire. An area source with an uneven distribution of luminance across its surface will clearly result in an uneven distribution of illuminance on a plane located in close proximity to the source. This illuminance distribution will vary as the plane is moved away from or towards the source.

The concept of near-field photometry for luminaires has become increasingly important in the lighting industry as attention has focused on the need to evenly illuminate the ceilings of offices equipped with video display terminals. In order to properly design lighting systems for such applications, architects and engineers need to know the three dimensional near-field flux distributions of the luminaires being considered.

Prior art near-field photometric techniques are subject to a number of disadvantages, as hereinafter explained. The present invention is based on a new approach to measuring the three-dimensional near-field flux distribution of a luminaire. It differs from the prior art in that it directly measures the flux distribution, with no reference to the geometry or surface luminance of the luminaire.

SUMMARY OF THE INVENTION

In accordance with the preferred embodiment, the invention provides a method of measuring the photic field surrounding a light source. The light source is enclosed within a notational volume (such as a sphere). A helios meter (the term "helios" is hereinafter defined) is located at a position on the surface of the volume to collect flux through a field of view $F(i,j)$. The variables "i" and "j" are initialized. The helios meter is then oriented in a direction such that its field of view intersects a selected segment $S(i,j)$ of the projected view of the light source. The helios $H(i,j)$ is measured at that position and in that direction.

The helios meter is then reoriented in a direction such that its field of view intersects a segment of the projected view different from the previously selected segment(s). The variable "j" is incremented by 1, and the helios $H(i,j)$ is measured in the new direction. These steps are repeated for a selected number of segments.

The helios meter is then relocated to a position on the surface of the volume different from the previous position(s). The variable "i" is incremented by 1, and the previous steps, commencing with the initialization of the variable "j", are repeated for a selected number of positions on the surface of the volume. The method yields a series $H(i,j)$ of helios measurements for the selected positions "i" and directions "j".

The light source may be any object which emits incoherent electromagnetic radiation, whether in the visible or invisible portion of the spectrum.

The invention further provides a method of predicting the illuminance or irradiance at a point on an arbitrary plane which intersects the photic field surrounding a light source. The plane may for example represent a ceiling or a wall which is to be located near the light source. The light source's photic field is first measured as outlined above. A point is defined on the plane, exterior to a notional convex volume which exactly bounds the light source. The following steps are performed for each of the previously derived helios measurements $H(i,j)$: $F'(i,j)$ is defined as the mirror image of the field of view $F(i,j)$ along the optical axis. If either $F(i,j)$ or $F'(i,j)$ intersect the previously defined point, then $\alpha(i,j)$ is defined as the angle between the optical axis of the field of view $F(i,j)$ and the normal to the plane at the point. If $\alpha(i,j)$ is defined, and if $\alpha(i,j) < 90°$; then $D(i,j)$ is assigned as equalling $H(i,j) \cdot \cos \alpha(i,j) \cdot \Omega(i,j)$, where "$\Omega(i,j)$" is the solid angle of the helios meter's field of view. Otherwise, $D(i,j)$ is assigned as equalling 0. Finally, the expression $\Sigma D(i,j)$ for all values of i and j is assigned as equalling the illuminance or irradiance at the previously defined point.

The invention further provides an apparatus for measuring the photic field surrounding a light source. The apparatus may comprise a helios meter, with means for selectively positioning the helios meter to measure the helios of any selected segment of the projected view of the light source from any selected position of the helios meter relative to the light source.

Alternatively, the apparatus may comprise a plurality of helios meters, and means for selectively positioning each helios meter to measure the helios of any selected segments of the projected views of the light source from any selected positions of the helios meters relative to the light source.

Advantageously, the helios meter(s) are compound meters capable of simultaneously measuring the helios of each one of a plurality of selected segments of the projected view.

As a further alternative, the apparatus may comprise a compound helios meter for measuring the helios of a plurality of selected segments of a projected view of the light source. A rotatable arm constrains the position of the helios meter to a circular path enclosing the light source, such that the meter's composite field of view always contains the entire projected view of the light source. Means are provided for rotating the light source about an axis orthogonal to the arm's axis of rotation and intersecting the notional center of the circular path. Advantageously, a control means may be provided for controllably positioning the rotatable arm and for rotating the light source about its axis.

BRIEF DESCRIPTION OF THE DRAWINGS

FIG. 2 illustrates a prior art apparatus for performing Application Distance Photometry.

FIGS. 9A and 9B are respectively oblique perspective and side elevation views of the preferred near-field photometric apparatus of the invention.

DETAILED DESCRIPTION OF THE PREFERRED EMBODIMENT INTRODUCTION

As used herein, the term "light source" refers to any object which emits incoherent electromagnetic radiation. Examples include visible light, infrared radiation, ultraviolet light, X-rays and gamma rays. Given that photometric and radiometric measurements are equivalent apart from units of measurement (i.e. 1 lumen = 1/683 watt at a wavelength of 540 nanometers), the following terms (as defined in ANSI/IES [1986]) are hereinafter used interchangeably: "photometry" and "radiometry"; "photometric" and "radiometric"; "photometer" and "radiometer"; "illuminance" and "irradiance"; "luminance" and "radiance"; and, "luminous" and "radiant".

PRIOR ART

One indirect approach to measuring the near-field flux distribution of a luminaire is to model its luminous surface as an array of point sources. The illuminance of a point on a plane located near the luminaire can then be calculated by applying the Inverse Square Law to each point source, assuming that its far-field flux distribution and distance from the point on the plane are known. The approach requires dividing the surface of the luminaire into segments such that the projected width of each segment as seen from the point on the plane does not exceed that dictated by the Five-Times Rule. Far-field flux distribution measurements are then made for each segment. The location of the equivalent point source in space is assumed to be the geometric center of the segment.

In "A Method of Testing and Evaluating Fluorescent Luminaires" (Illuminating Engineering 45:12, 763-770 [1950]) K. Franck proposed physically baffling the light emitting surface of a fluorescent luminaire as a means of reducing the goniophotometer space requirements implied by the Five-Times Rule for long linear fluorescent luminaires. Each exposed segment was measured separately with a far-field goniophotometer and the results summed to provide far-field photometric data for the entire luminaire. Franck also noted that illuminance calculations made for linear fluorescent luminaires often violated the premise of the Five-Times Rule. He proposed that the luminaire be divided into segments, with illuminance calculations performed for each segment as described above.

Figure 1:
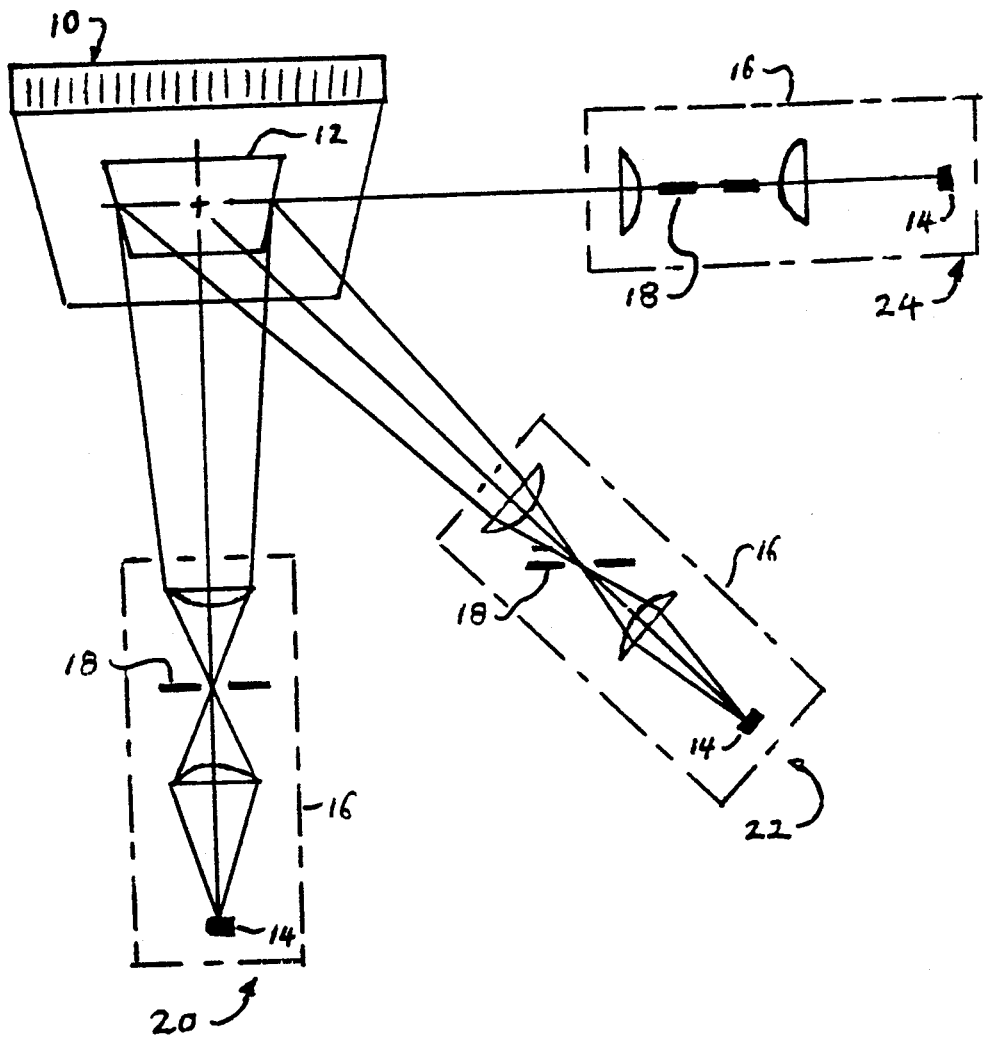
FIG. 1 illustrates a prior art apparatus for measuring the distribution of luminance on the surface of a light source; the apparatus being shown in three different positions.

Franck's method suffered from several technical difficulties, including light leaks, light reflected back into the luminaire from the baffles, and lamp temperature stabilization problems. Lautzenheiser, Weller and Stannard sought to overcome these difficulties. See: "Photometry for Near Field Applications", J. IES 13:1, 262-269 [1984]. As shown in FIG. 1, their approach was to divide the luminaire 10 optically by projecting an aperture 12 onto luminaire 10. Aperture 12 serves as a window for photosensor 14. Their experimental apparatus consisted of a lens-type luminance meter 16 equipped with a rotatable field stop 18 aimed at luminaire 10. Meter 16's field of view defines aperture 12 (i.e. a "segment") on the surface of luminaire 10 when meter 16 is focused on that surface. As shown by the three different meter positions 20, 22, 24 illustrated in FIG. 1, field stop 18 is rotated such that it remains parallel with the surface area of luminaire 10 being imaged by meter 16. More particularly, position 20 shows field stop 18 fully open; position 22 shows field stop 18 partially open; and, position 24 shows field stop 18 fully closed.

Although the approach of Lautzenheiser et al avoids the technical difficulties inherent in Franck's method, it has several important limitations. For example, each segment must approximate a planar surface. If the surface is convex or concave then the outline of the projected aperture will vary as the segment is imaged from different angles. Similarly, the entire body of the luminaire must have a convex three-dimensional shape. Otherwise, as explained below in relation to FIG. 7, some segments will be partly or completely occluded when they are viewed from oblique angles.

Another problem occurs due to the limited depth-of-field of lens-type luminance meters. As noted by Spencer and Levin in "On the Significance of Photometric Measurements", Illuminating Engineering 61:4, 196-204, [1966], an out-of-focus image can result in significant luminance measurement inaccuracies. Depth-of-field problems can occur when a segment is imaged at an oblique angle, where both the segment itself and the rotatable field stop used to project the segment onto the luminaire surface may be unacceptably out of focus at their extremities. The boundary of the projected aperture is then blurred, with overlap occurring between adjacent imaged segments.

A further complication arises when the luminaire surface being imaged is transparent or specular (e.g. a clear plastic lens, or an aluminum reflector). As noted by Spencer and Levin, the meter must be focused on the surface itself to accurately measure the luminance of the segment; it must not be focused on what is visible through or reflected from the surface. This may require a detailed knowledge of the geometry of the luminaire and some means of automatically focusing the meter according to this knowledge.

P. Ngai performed a mathematical analysis of the requirements of near-field goniophotometry. See: "On Near-Field Photometry", J. IES 16:2, 129–136, [1987]. His basic conclusion was that "for any luminous body, the luminance at any location p in the direction r can be represented by the function L(p,r)", where p is a point on the surface of the luminous source. Ngai used this function to derive a formula for calculating the illuminance at a point on a plane due to an extended (i.e. area) source. This formula presupposes a detailed knowledge of the geometry of the source in relation to the point.

Another indirect (and somewhat limited) approach to measuring the near-field flux distribution of a luminaire was proposed by Stannard and Brass. See: "Application Distance Photometry", J. IES 19:1, 39–46 [1990]. As shown in FIG. 2, they suspended an illuminance meter 30 at a fixed distance d above a luminaire 32. They then scanned meter 30 across luminaire 32 by sliding it in a straight line along track 34. The data so obtained was used to represent the illuminance of a ceiling plane located at the same distance d above luminaire 32, where the luminaire was modelled as an equivalent point source which would produce the observed illuminance distribution at that distance. These results were only valid for the one plane-to-luminaire distance d. Stannard and Brass called their method "Application Distance Photometry".

Figure 3A:
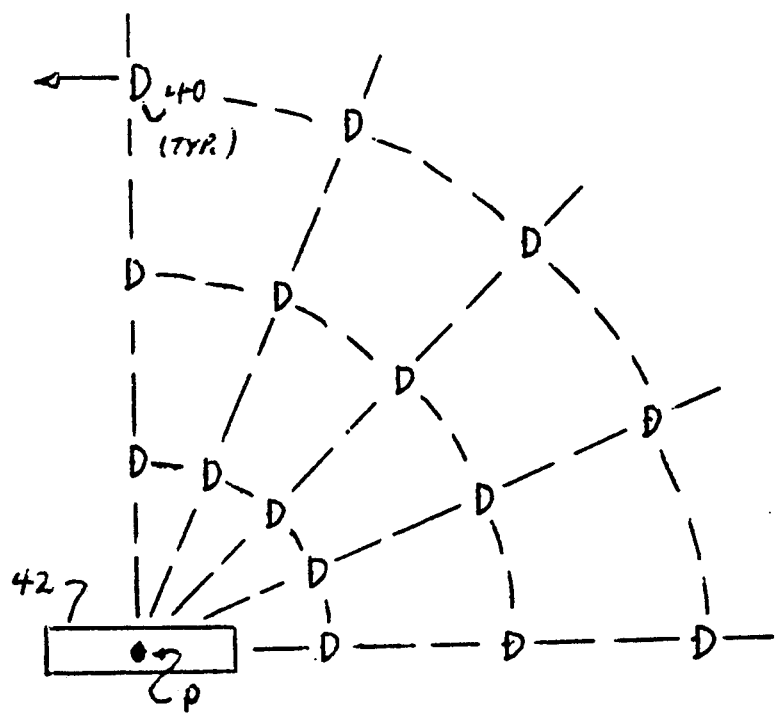
FIGS. 3A and 3B illustrate a prior art apparatus for performing a more general Application Distance Photometry technique.
Figure 3B:
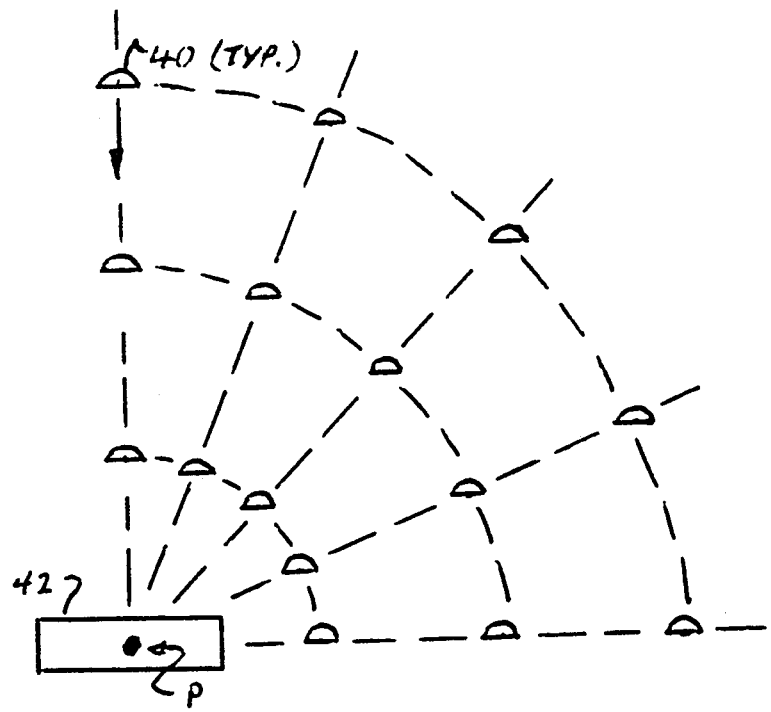

In "Near-Field Photometry: Measurement and Application for Fluorescent Luminaires", Proceedings of the IESNA 1991 Annual Conference, IESNA, New York, N.Y., P. Ngai, F. G. Zhang and J. X. Zhang presented a generalization of Application Distance Photometry. Whereas Stannard and Brass measured the illuminance at selected points on a horizontal plane parallel with the luminaire axis, Ngai et al measured the illuminance at a multiplicity of selected points on a set of concentric spheres surrounding the luminaire. As shown in FIGS. 3A and 3B, two measurements were made at each point—one with the meter 40 oriented horizontally (FIG. 3A shows a plurality of such meter positions, each represented by the symbol "D") and the other with the meter oriented vertically (FIG. 3B shows a plurality of such meter positions). The luminaire 42 was then modeled as an equivalent point source P which would produce the measured illuminances.

While the method of Ngai et al does provide useful information on the near-field flux distribution of a luminaire, it cannot completely characterize the field. In particular, the modelling of the luminaire as an equivalent point source means that if an object partially occludes the projected view of the luminaire as seen from a point on a plane, the method of Ngai et al cannot predict the illuminance at that point.

THE HELIOS CONCEPT

The term "helios" is not defined in ANSI/IES [1986]. It is a generalization of the concept of luminance proposed by P. Moon and D. E. Spencer in "Brightness and Helios", Illuminating Engineering 39:9, 507–520, [1944]; and, "The Photic Field", MIT Press, Cambridge, Mass., [1981] (hereafter referred to as Moon and Spencer [1981]). They defined the luminance of a surface as ". . . the luminous intensity of any surface in a given direction per unit of projected area of the surface as viewed from that direction". The concept of "helios" extends this definition to include volume sources such as the sky which have a measurable luminance, but only an apparent surface.

Figure 4:
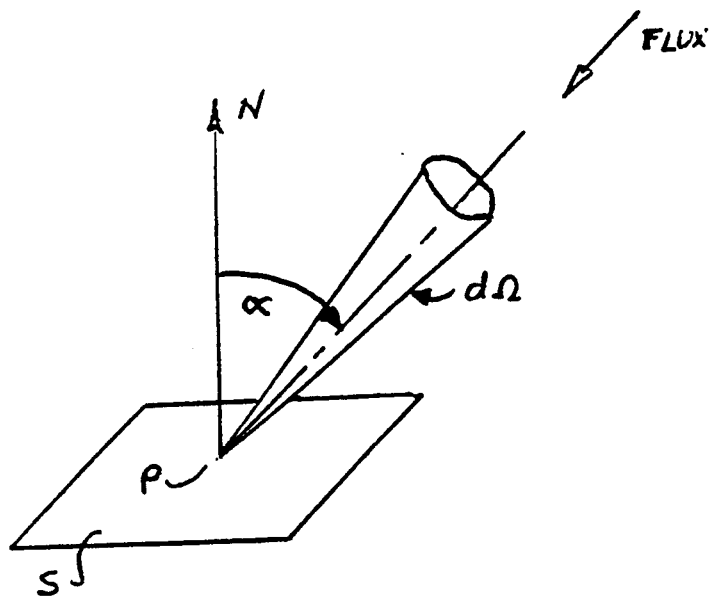
FIG. 4 illustrates the definition of luminance for a receiving surface as defined in the American National Standard Nomenclature and Definitions for Illuminating Engineering (ANSI/IES RP-16-1986), IESNA, New York, N.Y., hereafter referred to as "ANSI/IES [1986]".

As illustrated in FIG. 4, ANSI/IES [1986] notes that luminance may be measured at a point "P" on a receiving surface "S" by using the formula:

$$L = dE/(d\Omega \cos \alpha) \quad (1)$$

where "L" is the luminance, "E" is the illuminance, "$d\Omega$" is an elemental cone containing the luminous flux, and "$\alpha$" is the angle between the axis of elemental cone $d\Omega$ and a vector "N" normal to surface "S". The unit of measurement is lumens per steradian per square meter (lm/(sr−m$^2$)). The flux is considered to be due to "the luminance of the emitting surface".

Moon and Spencer define "helios" in a similar manner, except that the light emitting surface is generalized to include the entire volume of space contained in the elemental cone $d\Omega$, and the angle $\alpha$ is always zero degrees. Their proposed unit of measurement for luminous flux is the "blondel", defined as $\pi$·lumens per steradian per square meter ($\pi$·lm/(sr−m$^2$)). For radiant flux, they proposed the term "herschel", defined as $\pi$·watts per steradian per square meter ($\pi$·watts/(sr−m$^2$)).

Figure 5:
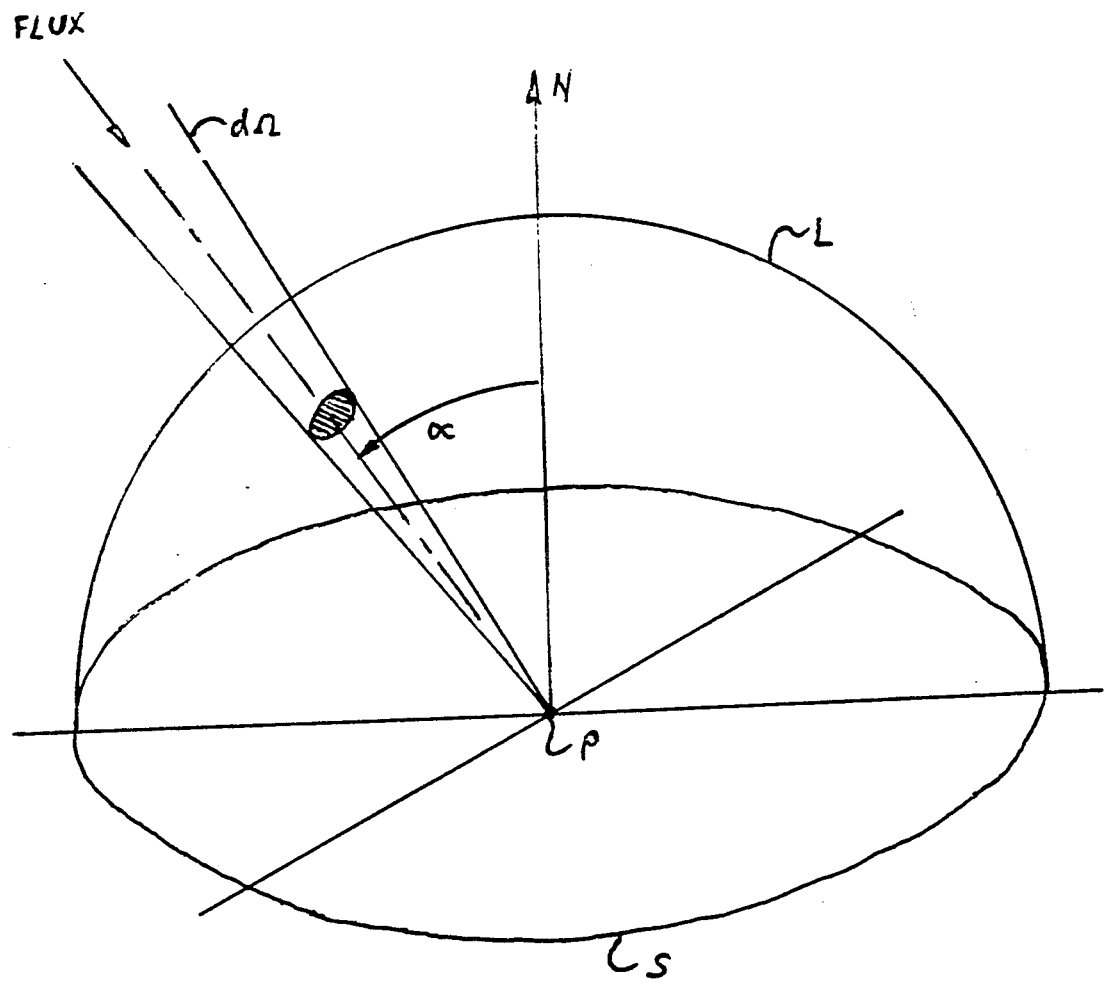
FIG. 5 illustrates the prediction of illuminance at a point on a plane from a set of helios measurements.

Assuming full knowledge of the distribution of flux surrounding a luminaire, the prediction of illuminance at a point on a plane is a basic result of photometric science, and is implicit in the definitions of luminance and illuminance. As shown by Moon and Spencer [1981], the relationship also applies to illuminance and helios, and is expressed in integral form as:

$$E = \frac{1}{\pi} \int_\Omega H \, d\Omega \cos \alpha \quad (2)$$

where "E" is the illuminance, "H" is the helios, and, as shown in FIG. 5, "$d\Omega$" is an elemental cone containing the luminous flux, "$\alpha$" is the angle between the axis of elemental cone $d\Omega$ and the vector "N" normal to surface "S", and the integration is performed over the entire hemisphere "L".

A summation form of equation (2) is part of a computer graphics technique known as the "Hemicube Method" for computing approximate radiosity form factors used in the computer generation of photorealistic images. See for example M. F. Cohen and D. P. Greenberg: "The Hemi-Cube—A Radiosity Solution for Complex Environments", ACM Transactions on Computer Graphics 19:3 (SIGGRAPH '85 Proceedings), 31–40 [1985]. The summation form differs from the integral form of equation (2) primarily in that a finite solid angle is used to approximate the elemental cone.

Figure 6:
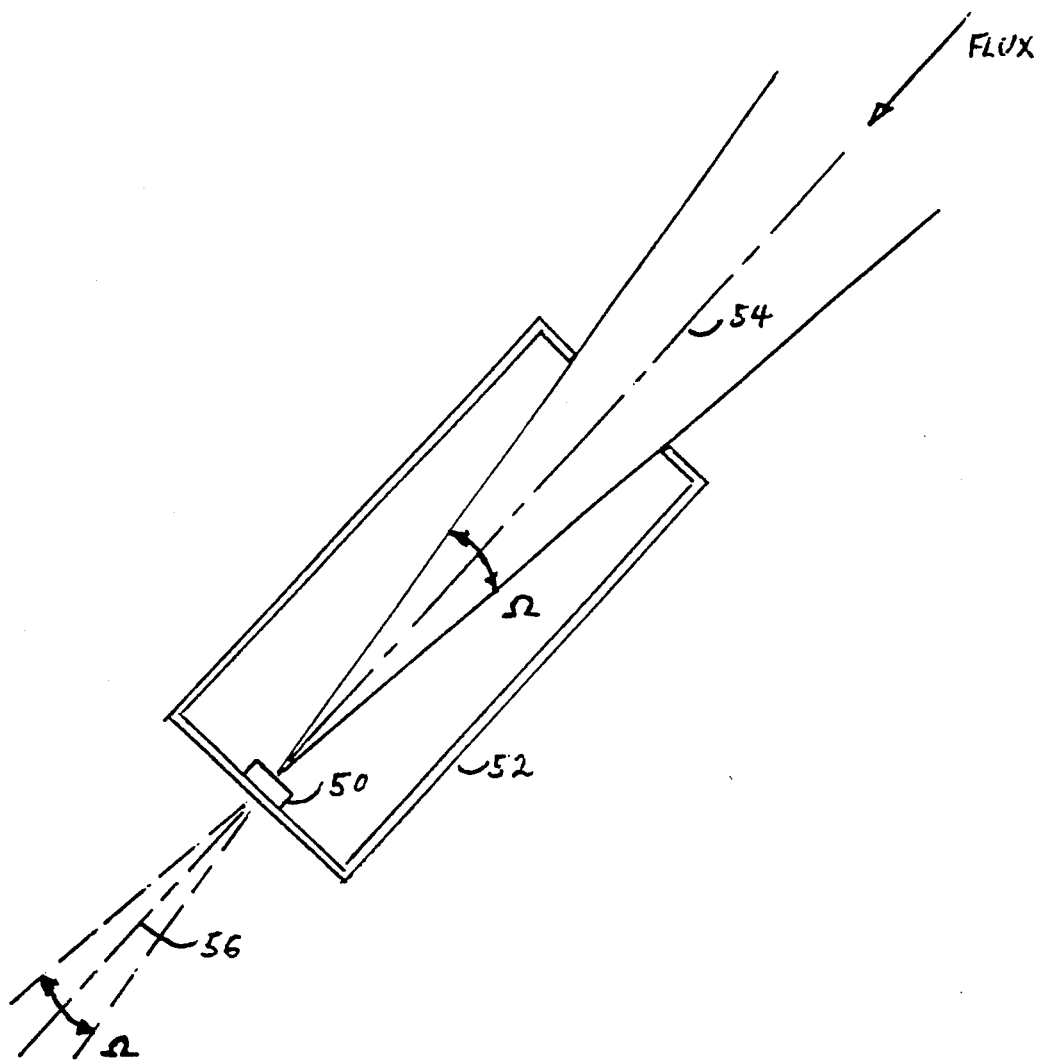
FIG. 6 illustrates the basic operation of a helios meter.

FIG. 6 illustrates the most basic form of helios meter, consisting of a photoelectric receptor 50 placed at the end of a long tubular opaque baffle 52 which limits the solid angle Ω (i.e. limits the field of view of the instrument along optical axis 54) through which luminous flux reaches receptor 50. The FIG. 6 helios meter is identical in construction to an aperture-type luminance meter. Like luminance, helios is rigorously defined for an infinitesimally small solid angle. A practical helios (or luminance) meter can therefore only measure an average value over a small but finite solid angle Ω.

A helios meter can be located at any point in three-dimensional space and pointed in any direction. The meter measures the luminous flux contained within the solid angle Ω which is incident upon the meter's sensor 50. Measuring the helios in every direction at every point in a volume of space is equivalent to measuring the flux distribution within that space.

Helios is a measurement of the directional flux present at a point in space, and so the measurements are independent of the source of flux. The source can in fact be exterior to the volume of space that is measured. This means that no reference need be made to the location of the light source (luminaire), its geometry or its surface luminance distribution.

Moon and Spencer [1981] refer to the flux distribution in a volume of space for an incoherent luminous or radiant flux source as a "photic field". While not recognized by ANSI/IES [1986], the term is adopted herein.

THE INVENTION

It is generally not necessary to perform helios measurements at every point in a volume of space in order to measure its photic field. Each helios measurement in effect measures the helios of a directed geometric ray of light. Assuming that these rays do not interact with their environment or each other within the volume of space (i.e. the space is filled with an unobstructed, homogeneous and transparent medium in which no reflection, refraction, absorption, scattering or diffraction occurs—typically air), whatever geometric ray is measured at some point on the surface of the volume must have either originated inside the volume or entered the volume at exactly one point on the other side. By taking measurements at all interior angles for all points on the surface of the volume, the photic field at all points within the volume can be completely characterized. To clarify this point, consider any point within an empty volume of space. Any geometric ray of luminous flux intersecting this point must also intersect the surface of the volume, where it can be measured with a helios meter. Conversely, any geometric ray intersecting the point can be uniquely determined from the set of all helios measurements taken on the surface of the volume.

It is important to note that the helios of a directed geometric ray does not vary along its length in the volume of space. In other words, a helios measurement taken on the surface of the volume and in a given direction will be the same as a helios measurement taken anywhere inside the volume in the same direction. This will not strictly apply for an average helios measurement taken over a finite solid angle. However, if the angle is sufficiently narrow (about 0.5 degrees) then a helios measurement taken on the surface of the volume can be applied anywhere along the directed geometric ray within the volume with negligible error.

Figure 7:
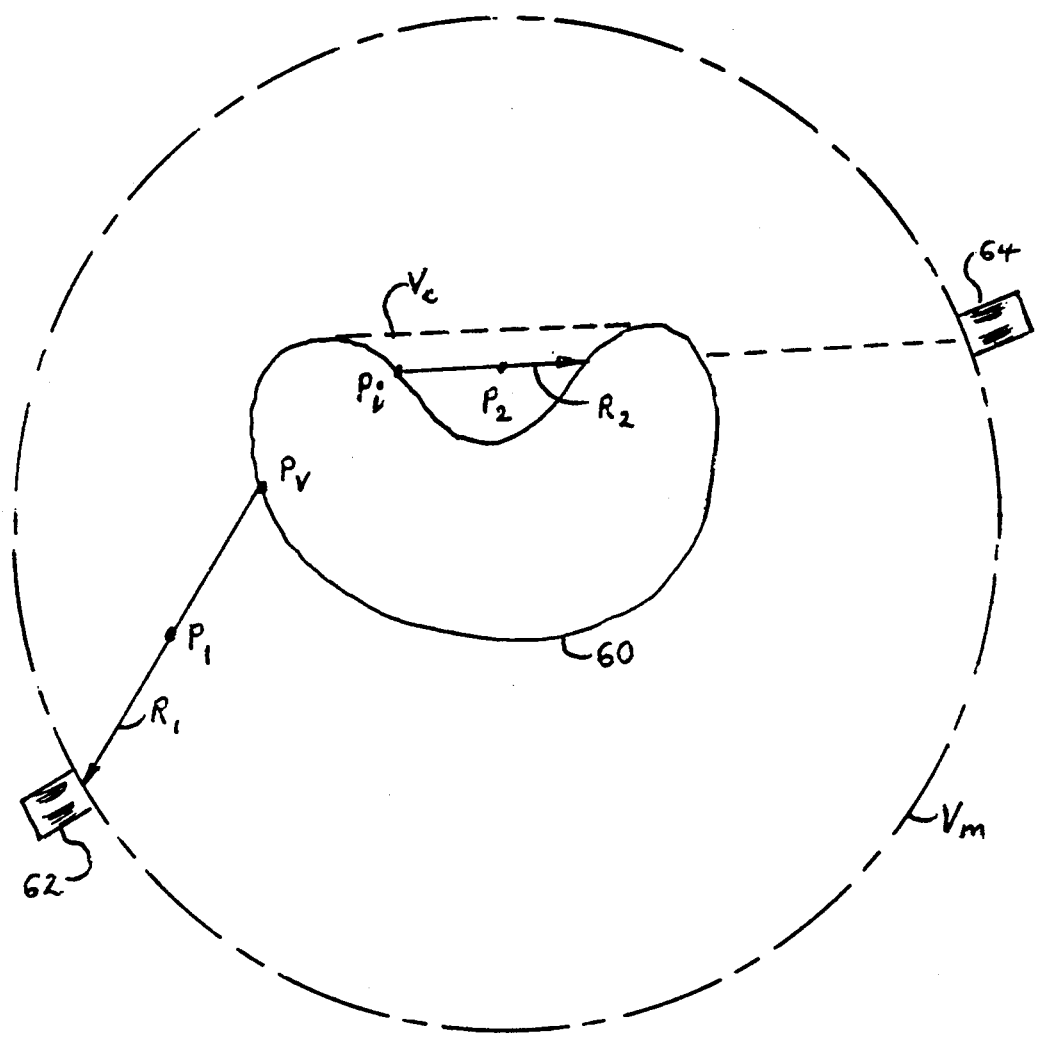
FIG. 7 illustrates a region of space in which the flux distribution (photic field) surrounding an arbitrarily shaped light source can be characterized.

The luminous flux source can be located inside the volume of space. Obviously, the helios measurements performed on the surface of the volume are incapable of characterizing the photic field inside the body of an opaque source. As shown in FIG. 7, such measurements are in general incapable of fully characterizing the photic field at any point where a geometric ray emanating from an arbitrarily shaped luminaire 60 intersects another point on luminaire 60. For example, if a helios meter is at position 62 shown in FIG. 7, then the meter's view of point $P_1$ is not obstructed by luminaire 60. Accordingly, the meter is able to account for the photic field contribution made by point $P_v$ on light source 60 intersected by a ray $R_1$ drawn through the meter and point $P_1$. However, if the meter is moved to position 64, then the meter's view of point $P_2$ is obstructed by luminaire 60. Thus, the meter is unable to account for the photic field contribution made by point $P_i$ on light source 60 intersected by a ray $R_2$ drawn through the meter and point $P_2$. In mathematical terms, the point must be outside a convex volume $V_c$ which exactly bounds luminaire 60.

Both the inner convex volume $V_c$, and the outer volume $V_m$ on whose surface the helios measurements are performed, are entirely imaginary. The outer volume $V_m$ is defined by whatever points are chosen to take the helios measurements from. The inner volume $V_c$ simply serves as an aid to isolate regions of space within which the helios measurements cannot be used to characterize the photic field.

FIG. 6 makes it apparent that if the helios meter were not present to intercept the luminous flux contained within its field of view, that flux would continue to propagate through the position occupied by the meter and continue outwards into a "mirror image" 56 of the solid angle Ω defined by the meter's field of view. It can thus be seen that the set of all helios measurements taken on the surface of the outer volume $V_m$ (FIG. 7) completely characterizes the photic field not only inside the volume (excluding the inner convex volume $V_c$ enclosing luminaire 60), but outside it as well.

Having characterized the photic field in a volume of space, it follows that the illuminance of a point on an arbitrary plane which intersects that volume can be predicted by considering each helios measurement as a directed geometric ray which is coincident with the optical axis 54 of the helios meter (FIG. 6), and whose direction is that of the flux incident upon the meter's photosensor 50. A subset of these rays will intersect the point. Only those rays whose angle with respect to the plane normal at that point is greater than 90° will contribute to the illuminance of the point. The illuminance can then be calculated using equation (2).

As previously noted, practical helios and luminance meters have finite fields of view. Therefore, it is necessary in practice to perform helios measurements for selected meter orientations, such that the field of view for each orientation does not overlap those of neighbouring orientations. These orientations should be chosen such that the helios values of intermediate orientations can be reasonably interpolated from the measured values for the photic field in question.

It is also impractical to perform helios measurements at every position on the surface of the enclosing volume. Positions should be selected such that helios values at intermediate positions can be reasonably interpolated from the measured values.

For each selected meter position, the set of selected meter orientations (each with its own unique field of view) will define an array of solid angles that divides the projected view of the source into "segments". Obviously, only those meter orientations whose respective fields of view intersect a segment of the projected view will result in non-zero helios values. (This applies whether the source is inside or outside the volume defined by the set of meter positions.)

Thus, given a practical helios meter and having obtained a set of helios measurements for selected meter orientations and positions, the approximate illuminance of a point on a plane can be predicted using a summation form of the equation relating helios and illuminance:

$$E = \frac{1}{\pi} \Sigma H \cos \alpha \, D\Omega \quad (3)$$

where "E" is the illuminance, "H" is the helios, "$D\Omega$" is the solid angle containing the luminous flux (i.e. the field of view of each helios measurement), "$\alpha$" is the angle between the solid angle and the plane normal, and the summation is performed for all solid angles comprising the notional hemisphere centred over the point on the plane (see FIG. 5).

While useful for demonstrating the principles of helios meters, an aperture-type helios meter such as that shown in FIG. 6 is not a practical instrument for purposes of the present invention. It is difficult to construct such an instrument with a narrow field of view, since tubular baffle 52 becomes impractically long.

Figure 8A:
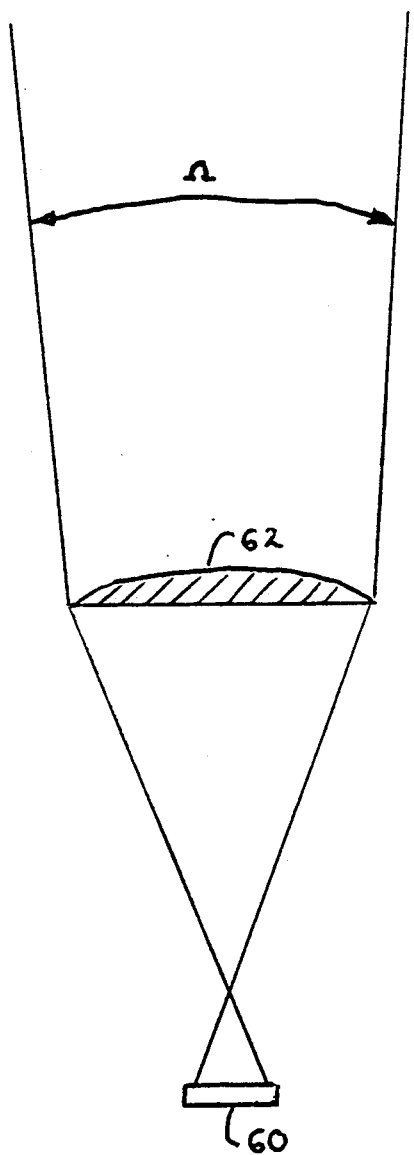
FIGS. 8A and 8B illustrate the operation of a lens-type helios meter.
Figure 8B:
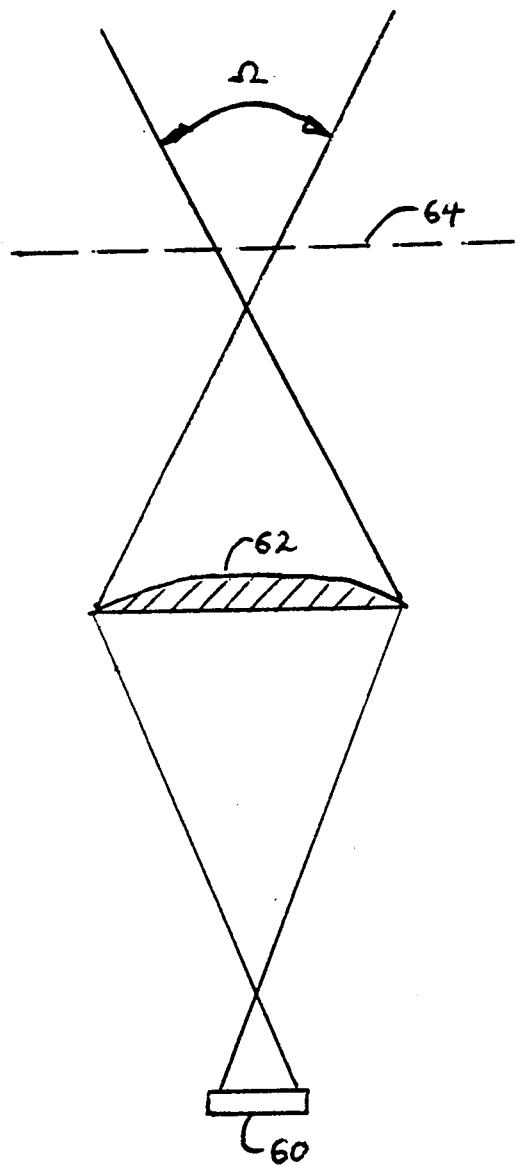

As illustrated by FIGS. 8A and 8B, a lens-type luminance meter having a photosensor 60 and an optical system represented by lens 62 can be used as a helios meter if the optical system is focused at infinity (FIG. 8A); or, is focused on an imaginary surface 64 which is closer to the meter than the surface of any light source expected to fall within the meter's field of view (FIG. 8B). (As FIG. 8B shows, the field of view $\Omega$ between focusing surface 64 and lens 62 defines a diverging rather than converging cone. This diverging cone is permitted by the IES/ANSI [1986] definition of luminance for an emitting surface, but has no meaning under the definition of helios. Therefore, the light source cannot be located between the lens 62 and the focusing surface 64.)

Helios meters can also be constructed using mirror or coded-aperture mask optics (see, for example, "X-Ray Imaging with Coded Masks", Scientific American (August, 1988 pp. 84–89). (Coded-aperture mask optics are applicable to X-ray and gamma ray radiation, where no suitable materials may exist to form lenses or mirrors.) As with lens-type optics, however, the optical system must be focused at infinity or on an imaginary surface in front of that of any expected light source within its field of view.

Helios meters with optical systems are identical to their luminance meter counterparts with the exception that they do not require a focusing mechanism. Their optics are not used to focus an image of the source on the photosensor, but merely to shorten the length of the instrument required for a given field of view.

The accuracy of the illuminance prediction method described herein depends upon the helios meter having a narrow field of view (i.e.—a small solid angle), since this field of view is used to approximate a geometric ray with an infinitesimal width. To this end, a "compound" helios meter can be constructed by replacing the single photosensor of a helios meter with a linear or matrix-type array sensor such as a "CCD" (charge coupled device) photodiode array. (Other array-type sensors can be used for wavelengths of light outside the visible portion of the spectrum.) Each photo-sensor element then becomes an independent helios meter with its own unique (and very narrow) field of view when the instrument is oriented in a given direction. When pointed at an extended light source, each element measures the helios of a separate segment of the source's projected view. If the entire source is within the compound meter's overall field of view for a given position, there is no need to reorient the meter at that position; all non-zero helios measurements can be measured simultaneously.

Currently available photosensor designs are limited to linear and rectangular arrays of photodiode elements where all elements have the same physical dimensions. When used with an image-forming optical system, each element of the image then has the same size. However, this means that the solid angle (angular field of view) covered by photodiodes on the edge of the array is greater than those in the center, particularly when wide-angle lenses are used to form the image—an unavoidable consequence of mapping spherical co-ordinates onto a linear or rectangular grid.

Fortunately, these varying fields of view do not limit the applicability of linear and matrix array-type photosensors to compound helios meter designs. The field of view of each photodiode can be easily calculated and incorporated in the illuminance prediction calculations.

It is preferable but not essential to focus the helios meter's optical system at infinity. As FIG. 8A illustrates, this results in the field of view having the smallest possible solid angle "$\Omega$", and eliminates the need to specify a minimum allowable distance between the meter and the luminaire.

As previously indicated, two types of photodiode arrays are suitable for compound helios meters: linear and matrix. The preferred array type is dependent upon the light source under consideration. For example, it may be reasonable to assume that a long linear fluorescent luminaire has a near-field photic field which is homogeneous along its length. The photic field need then only be measured in the vertical plane perpendicular to the luminaire's major axis, in which case a linear photodiode array is preferred. Other considerations in favour of linear arrays are higher available resolutions, greater signal-to-noise ratios and better photometric response uniformity between individual photodiodes. In general, however, a matrix-type photodiode array is preferred.

FIGS. 9A and 9B illustrate the preferred arrangement of the near-field goniophotometric apparatus suitable for measuring the photic field surrounding most commercial luminaires. The geometry and mounting requirements of other light sources may necessitate alternative mechanical arrangements.

A compound helios meter 70 is mounted on a rotatable arm 72 such that the meter's optical axis 74 intersects the arm's axis of rotation 76 at point P. A rotatable cradle 78 is located such that its axis of rotation 80 intersects point P, and is perpendicular to the arm's axis of rotation 76. A test luminaire 82 is mounted in cradle 78. Care is taken to ensure that the projected view of luminaire 82 seen from meter 70 is always entirely within the meter's composite field of view 84 (i.e. the combined fields of view seen by each of meter 70's photosensors). This restricts the size of luminaire which may be accommodated by the apparatus, but the restriction may be overcome by scaling the size of the apparatus up to accommodate luminaires of any desired size.

Helios measurements are performed as follows:

1. Arm 72 and cradle 78 are placed in some arbitrary starting position, with meter 70 oriented in a direction such that the individual fields of view of the meter's sensors each intersect a corresponding segment of the projected view of luminaire 82. Each field of view is designated "F(i,j)". The selected segments are designated "S(i,j)". The index "i" corresponds to the meter's position, and the index "j" corresponds to the direction of orientation of a particular field of view. The index "i" is initialized (i.e. i=1) for the starting position and sufficient indices "j"=1, 2, 3 . . . are assigned to correspond to each of the fields of view imaged by the compound helios meter. Meter 70 is used to measure the helios H(i,j) for the initial position and directions of orientation.

2. Meter 70 is repositioned by rotating arm 72 through some suitable angle (typically 0.5°). The index "i" is incremented by one to reflect the meter's new position. Meter 70 is used to measure the helios H(i,j) for the new position in each of the directions "j"=1, 2, 3 . . . of orientation defined by the fields of view of the compound helios meter.

3. Step 2 is repeated until arm 72 has been rotated through a full circle.

4. Cradle 78 is rotated through some suitable angle (typically 22.5°). Steps 1 through 3 are then sequentially repeated (except that the index "i" is not reinitialized) until cradle 78 has been rotated through 180°.

Many light sources are geometrically symmetric in one or more planes, or are designed such that their flux distribution is only significant in one hemisphere (such as ceiling-mounted luminaires). The above process can then be simplified to perform only those helios measurements which are of interest.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of measuring the photic field surrounding a light source, said method comprising the steps of:
    (a) enclosing said light source within a notional volume;
    (b) locating a helios meter having a narrow field of view F(i,j) at a position on the surface of said volume to collect flux through said field of view;
    (c) setting "i"=1;
    (d) setting "j"=1;
    (e) orienting said helios meter in a direction such that said field of view includes a portion of said light source;
    (f) measuring the helios H(i,j) at said position and in said direction;
    (g) reorienting said helios meter in a direction such that said field of view includes a portion of said light source different from said previously selected portion;
    (h) incrementing "j" by 1;
    (i) measuring the helios H(i,j) at said position and in said reoriented direction; and,
    (j) repeating steps (g) through (i) for a selected number of said portions;
    (k) relocating said helios meter to a position on said volume surface different from said previous position(s);
    (l) incrementing "i" by 1; and,
    (m) repeating steps (d) through (l) for a selected number of positions on said surface of said volume.

2. A method of measuring the photic field surrounding a light source, said method comprising the steps of:
    (a) enclosing said light source within a notional volume;
    (b) locating a compound helios meter having "n" narrow fields of view F(i,j) at a position on the surface of said volume to collect flux through said fields of view, wherein "i"=1 and "j"=1, 2, 3, . . . n, and wherein each of said fields of view includes a different portion of said light source;
    (c) measuring the helios H(i,j) at said position through each of said fields of view;
    (d) relocating said helios meter to a position on said volume surface different from said previous position(s);
    (e) incrementing "i" by 1; and,
    (f) repeating steps (c) through (e) for a selected number of positions on said surfaces of said volume.

3. A method as defined in claim 1 or 2, wherein said light source is a radiant or luminous source.

4. Apparatus for measuring the photic field surrounding a light source, said apparatus comprising:
    (a) a compound helios meter for measuring the helios of each one of a plurality of narrow fields of view, each of said fields of view including a different portion of said source; and,
    (b) a rotatable arm for constraining positioning of said helios meter to a circuit path centred on an axis of rotation of said arm and enclosing said source, such that the composite field of view of said meter includes all portions of said source visible from any position of said meter on said path.

5. Apparatus as defined in claim 4, further comprising means for rotating said source about an axis orthogonal to said axis of rotation and intersecting said centre of said circular path.

6. Apparatus as defined in claim 5, further comprising means for rotating said rotatable arm about said axis of rotation.

* * * * *